United States Patent [19] [11] 4,357,906
Kratky [45] Nov. 9, 1982

[54] ANIMAL RESTRAINT

[75] Inventor: Frank Kratky, Bellvue, Colo.

[73] Assignee: Westguard Products, Inc., Cheyenne, Wyo.

[21] Appl. No.: 289,729

[22] Filed: Aug. 3, 1981

[51] Int. Cl.³ .......................... A01K 1/06; A01K 1/062
[52] U.S. Cl. .................................. 119/98; 119/147 A
[58] Field of Search .................... 119/98, 99, 100, 147, 119/103; 49/107

[56] References Cited

U.S. PATENT DOCUMENTS

| | | | |
|---|---|---|---|
| 14,047 | 1/1856 | Brown | 49/107 |
| 3,691,998 | 9/1972 | Luinstra | 119/98 |
| 3,960,113 | 6/1976 | Kratky | 119/99 |

Primary Examiner—Hugh R. Chamblee
Attorney, Agent, or Firm—Hugh H. Drake

[57] ABSTRACT

A headgate has a pair of generally-upright elongated pipes spaced apart somewhat greater than the width of an animal to be restrained. The pipes are mounted for rotation, and spur gears are mounted respectively near one end of each of the pipes. A pair of elongated tubes are positioned generally inside of the pipes with the tubes being coupled to the pipes and at least an upper end portion of one of the tubes being movable with respect to its adjacent pipe but urged away therefrom. The assemblies of the other ends of the pipes and the adjacent ends of the tubes are releasably latchable into a closed condition in which the tubes are positioned between the pipes. As one basic feature, a pair of idler gears are disposed between the spur gears, with one of the idler gears being meshed with the first spur gear and the other idler gear being meshed with the second spur gear and with said idler gears also being mutually intermeshed, so that there is a complete slaving action of the pipes in rotation. As another principal feature, a lever is affixed to the restraint adjacent to a side of one of the assemblies and is swingable toward and away therefrom. An opening device is mechanically coupled between the lever and at least one of a pipe and a tube to enable a swingable opening of the one assembly by manipulation of the lever.

7 Claims, 9 Drawing Figures

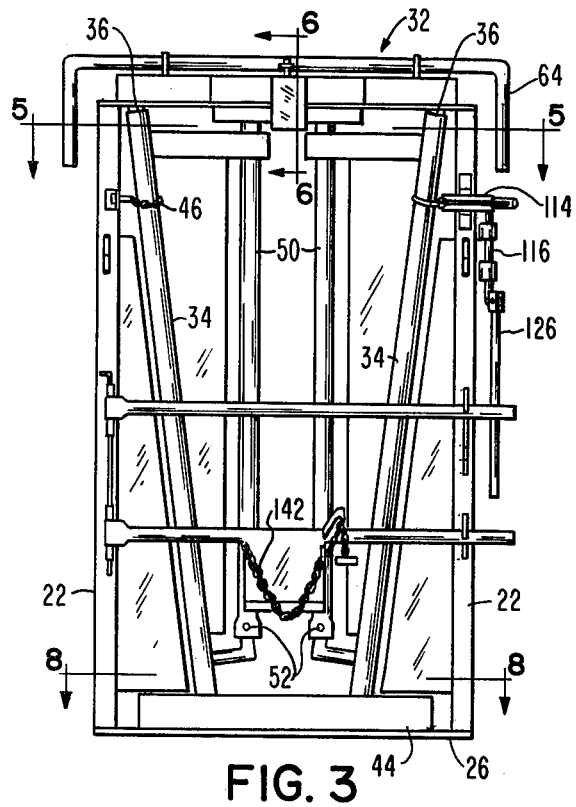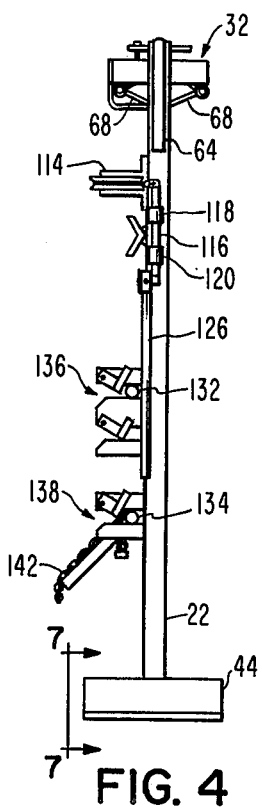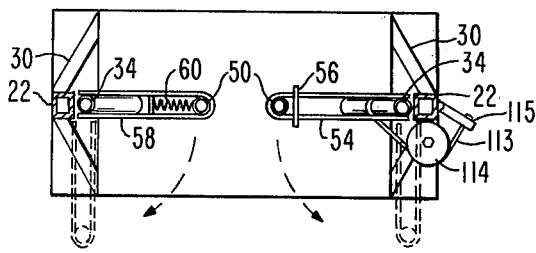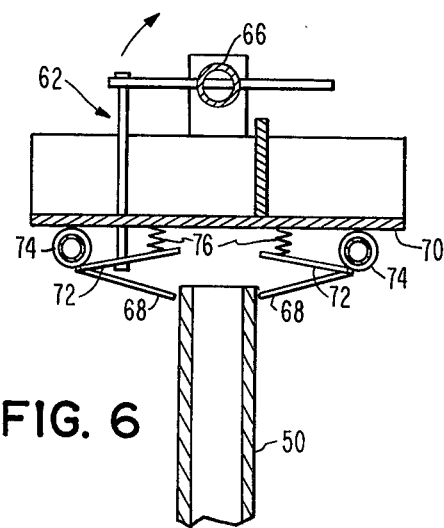
FIG. 3
FIG. 4
FIG. 5
FIG. 6

ANIMAL RESTRAINT

The present invention relates to an animal restraint. More particularly, it pertains to a restraint for selectively securing the neck of an animal undergoing a process like branding or veterinary treatment.

In the handling of livestock for such purposes as branding, brand inspection, pregnancy testing and the administration of medical treatment, it often is desirable to drive the stock through a chute to and into a clamping arrangement. With animals such as cattle, the clamping arrangement frequently includes a headgate which must securely and yet non-injuriously restrain the neck of the animal so as to resist further movement either forwardly or backwardly. Examples are U.S. Pat. Nos. 3,814,060—Swenson and 3,221,707—Pearson.

A particularly suitable form of headgate is that described and claimed in U.S. Pat. No. 3,960,113—Kratky now assigned to the same assignee as the present application. That patent features an assembly of space-opposed tubes arranged to accommodate insertion of the head and neck of the animal therebetween for restraint and yet being swingable apart, upon release of a latching mechanism, to allow exit of the animal when ultimately desired. One salient feature of the apparatus described in the Kratky patent is the provision of intermeshing spur gears that slave the tubes one to another so that, upon release of the latch, a swinging to an open condition of either tube effects an analogous swinging movement of the other of the tubes.

Even though a significant number of restraints constructed in accordance with the teachings of the aforesaid Kratky patent are not successfully in use, continued experience therewith has indicated a need for a degree of further improvement. Generally, the headgate of that patent required fully manual operation of both the opening and closing of the headgate. When the headgate was open to allow the release of one animal, the operator sometimes has to react quickly to insure that a following animal was not prematurely also released. Particularly when handling large animals, the attempt of the following animal to crash through the partially closed headgate would obviously cause the operator to back off, from completing a mechanical closure, in order to avoid injury. On occasion, that natural reaction enabled the animal undesirably to escape before the latch was secured.

The aforementioned Swenson patent suggests use of a handle operative to swing the headgate assembly. However, the manner in which it was mounted directly on the swingable portion of the headgate assembly is not compatible with the use of diverging hinge pipes as in the Kratky patent and affords only minimal leverage.

It is, accordingly, a general object of the present invention to provide a new and improved animal restraint as compared both with the restraints of the aforesaid patents and also as compared with other prior restraints described in those patents.

Another object of the present invention is to provide a new and improved animal restraint which achieves an increased degree of efficacy of operation.

A further object of the present invention is to provide a new and improved animal restraint that inhances the degree of safety both for the animal and the operator.

An animal restraint includes a pair of generally-upright elongated pipes spaced apart somewhat greater than the width of the animal to be restrained. The pipes are mounted to permit rotation of each pipe about its longitudinal axis. A first spur gear is mounted on one of the pipes near one end thereof, and a second spur gear similarly is mounted on the other of the pipes near a corresponding one end thereof. Also included are a pair of elongated tubes one of which is secured to one of the pipes in a generally parallel-spaced relationship and the other of which is coupled to the other of the pipes also in a generally parallel-spaced relationship. The upper end portion of the other tube is movable toward and away from the other pipe and is urged away from that other pipe. The assemblies of such other ends of the pipes and the adjacent tubes are releasably latched in a closed condition in which the tubes are positioned between the pipes.

In accordance with the first principal feature, a pair of idler gears are disposed between the spur gears, with one of the idler gears being meshed with the first spur gear and the other of the idler gears being meshed with the second spur gear, while at the same time the idler gears are mutually intermeshed all in a manner such that each of the pipes is slaved to the other in rotation.

As a further principal feature, there is a lever affixed to the restraint adjacent to the side of one of the assemblages of the pipes and tubes, and the lever is swingable toward and away therefrom. Mechanically coupling the lever to at least one of the pipes and tubes are opening means to enable a swingable opening of one of the assemblies by manipulation of the lever.

The features of the present invention which are believed to be patentable are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

FIG. 3 is a front elevational view of the headgate shown in FIG. 1;

FIG. 4 is a side elevational view thereof;

FIG. 5 is a fragmentary cross-sectional view taken along the line 5—5 in FIG. 3;

FIG. 6 is an enlarged fragmentary cross sectional view taken along the line 6—6 in FIG. 3;

Figure 1:
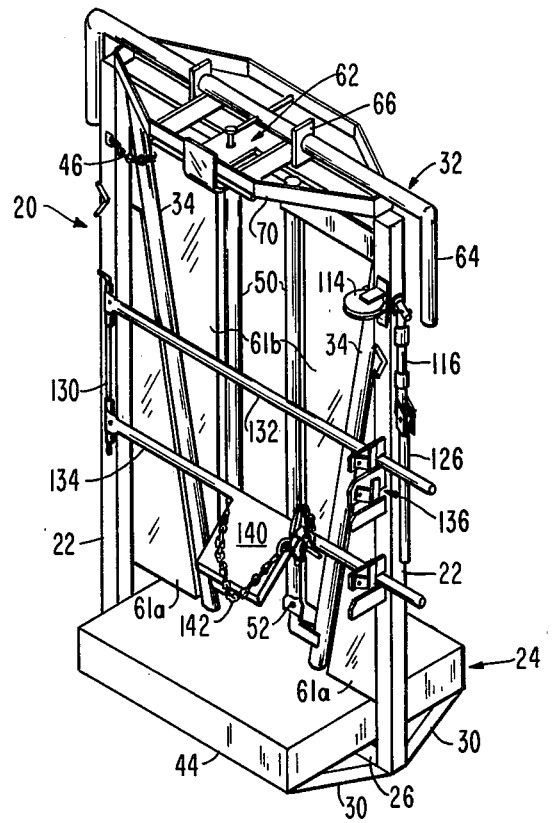
FIG. 1 is an isometric view of a headgate constructed in accordance with the present invention.

In the specific embodiment herein disclosed, a headgate 20 includes a generally-rectangular frame composed of uprights 22 secured respectively at their bottom ends to a base 24 by way of a base rail 26 disposed centrally between a pair of other rails 28 and with the entire base assembly being tied together and to uprights 22 by struts 30. Uprights 22 are secured between their upper ends by a header 32.

A pair of generally upright elongated pipes 34 are spaced apart somewhat greater than the width of at least the head of an animal to be restrained. Pipes 34 are mounted so as to permit rotation of each pipe about its longitudinal axis. More particularly, pipes 34 are hollow and journaled at their upper ends to respective downwardly depending pivots at 36 affixed to the bottom of header 32.

At their bottom ends, each of pipes 34 carry a spur gear. Thus one of the pipes includes a spur gear 38 secured, as by welding, to its lower end. The other of the pipes 34 includes a spur gear 40 similarly affixed. Pipes 34 are journaled at their lower ends upon upright pinions 42 that are affixed to rail 26 and project upwardly therefrom. The assembly which includes spur gears 38 and 40 all is enclosed by a cover 44. A limit chain 46, coupled at one end to an upright 22 and at its other end to one of pipes 34, limits rotational movement of that pipe 34 in an amount which precludes an inward movement of the entire gate assembly, yet to be described, backwardly beneath head 32 and beyond the latch assembly also yet to be further described.

Spaced inside pipes 34 are a pair of tubes 50 that are in generally-spaced relationship to the pipes. Each tube 50 is secured at it lower end to a lower portion of its associated pipe by a pivotal coupling 52. One of tubes 50 is secured at its upper end within a casing 54 by a pin 56 selectively locatable within casing 54 at one of the plurality of different holes distributed therein.

The other of tubes 50 is confined at its upper end within a similar casing 58 and urged, by a spring 60, away from its associated pipe 34 toward the center of the unit. Spring 60 provides sufficient resiliency to its associated one of tubes 34 to permit an animal to insert its neck further between the bars while yet exhibiting sufficient resistance to constrain the animal, in view of its usually more narrow neck, from withdrawing its head from the headgate assembly. Panels 61a and 61b serve to close the intervening spaces.

Completing the arrangement of headgate 32 is a releasable latch assembly 62 that is capable of retaining the overall composite structure or assemblage of pipes 34 and tubes 50 in a latched condition. Assembly 62 has a handle 64 swingable in a vertical plane to operate the latch mechanism and free the upper ends of tubes 50. More particularly, manipulation of handle 64 permits a swinging of assembly 62 about a pivot at 66 to move locking plates 68 into or out of captivating engagement with the upper end portions of tubes 50.

As herein illustrated, a bracket 70 is affixed to header 32. That serves to tie the entire latching assembly together in a rigid structure. Moreover, compression springs 76, disposed between fingers 72 secured on sleeves 74 and rigid relative to plates 68, serve to maintain the latter in a normally-locked position. On the other hand, plates 68 slant downwardly toward tubes 50 so that the latter may be swung into the locked position without requiring use of handle 64. That is the upper ends of tubes 50, on movement toward the locked position, cam plates 68 upwardly until the latch position is reached.

Figure 8:
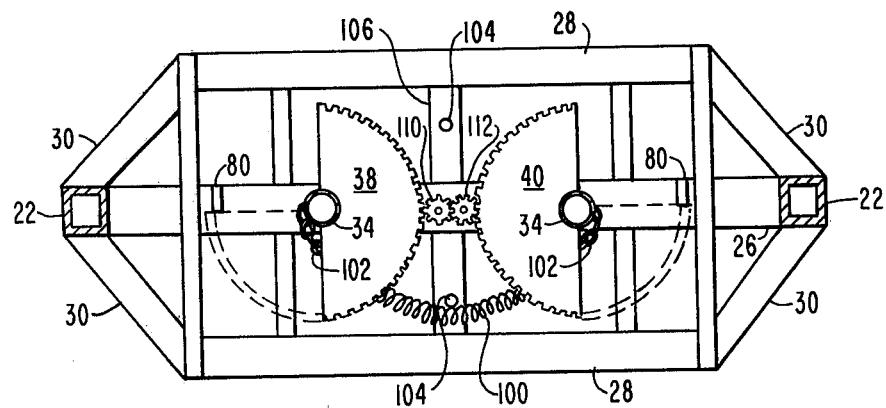
FIG. 8 is an enlarged cross-sectional view taken along the line 8—8 in FIG. 3 and again with that cover removed.
Figure 9:
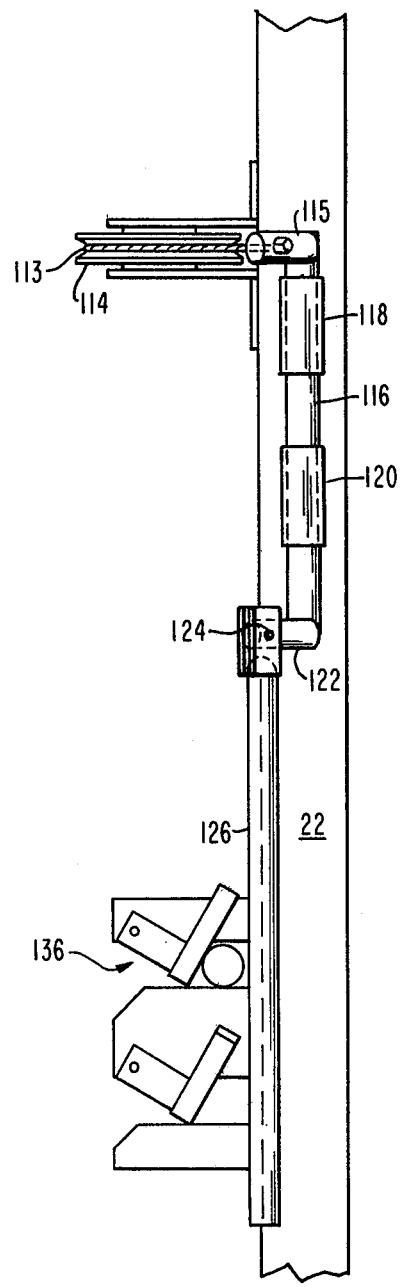
FIG. 9 is an enlarged fragmentary side elevational view of that shown in FIG. 4.

In the alternative, latch assembly 124, details of which are shown in FIGS. 8 and 9 of the aforesaid U.S. Pat. No. 3,960,113, is substituted for the specific form of latch assembly 32 shown herein. What appears to be the simplest and yet most durable approach would be a combination that uses the latch plate mounting of that prior Kratky patent with a laterally oriented handle like handle 64 as specifically illustrated herein.

Because each of spur gears 38 and 40 is a sector of angular extent, pipes 34 may be rotated through a range of approximately 90° to either side of a position at which tubes 50 are most closely together. Stops 80 project upwardly from rail 26 and in the path of each gear sector so as to limit their extent or range of angular movement. When handle 64 is rotated about its horizontal axis, the connection through a tie serves to raise blades and fingers 68 and 72 upwardly, about the pivotal axis for spindle 74, so as to raise blade 68 sufficiently to free the upper end of the constrained tube 50.

As thus far described, the assemblage is the same at least in principle as that disclosed in the patent first mentioned above. The disclosure of that patent, therefore, is incorporated here by reference. Insofar as there are specific differences as between the latching assembly and the manner of overall structure, the manner of approach of the patent may be substituted as indicated above.

Departing from a structural assembly at least similar to that of the patent, the present invention includes a spring 100 the opposing ends of which are coupled to the exterior side walls of respective ones of tubes 34. When tubes 34 are rotated in a direction so as to open the ultimate gate assembly, spring 100 is stretched in tension. The purpose of spring 100 is to bias the gate assembly toward a closed condition. At its respective opposing ends, spring 100 is firmly secured to the base portion of each of the respective base portions of pipes 34 by a short length of chain 102.

Spring 100 is maintained in tension by reason of its disposition on the outside of a post 104 that projects upwardly from a cross strap 106 which is rigidly affixed between outside rails 28. It will be noted that there is another post 104 toward the other end of strap 106. This permits the user to reverse the location within the base of spring 100 so as to reverse the operative direction of the main gate assembly of the headgate. It is also for that reason that there is a redundant one of the assembly of plates 68 and 72 as shown in FIG. 6. That is, the gate can be cammed into latching relationship from either direction, and the biasing arrangement on spur gears 38 and 40 is reversible.

It will be noted that spur gears 38 and 40 cant upwardly toward one another. Disposed between those spur gears are a pair of idler gears 110 and 112 mounted for rotation upon rail 26. Idler gears 110 and 112 intermesh together and individually intermesh respectively with spur gears 38 and 40. The result is that movement of one spur gear effects movement of the other spur gear through the combination idler gears 110 and 112. While spur gears 38 and 40 in this case are canted with respect to the horizontal, and in combination with the desired outward slant of pipes 34 so as to accommodate movement of the animal, idler gears 110 and 112 are mounted to rotate on axis that are vertical.

With the arrangement of the aforesaid patent, the equivalent of spur gears 38 and 40 were directly intermeshed. The inclusion of spring 100 with that assembly, so as to enable quick opening of the headgate by virtue of action of the spring, resulted in the necessity of a rather high degree of precision as between the mating of the teeth on the respective spur gears. The addition of idler gears 110 and 112 overcomes that need for precision. This also reduces the necessity of accuracy of alignment as between spur gears 38 and 40 in connection with their mounting on the base unit. Stated another way, the inclusion of idler gears 110 and 112 serves directly to reduce the necessity of maintaining accurate tolerances on all elements involved in the slaving arrangement, especially as it is augmented to include the automatic actuating force imparted by spring 100.

Secured around one of pipes 34 is a cable 113 that extends over a pulley 114 to a lever 115. Lever 115 is mounted on a spindle 116 which extends downwardly from lever 115 through a pair of bearings 118 and 120 mounted on the adjacent one of uprights 22. At the bottom end of spindle 116 is a laterally projecting stub 122 through which is disposed a locking pin 124. Mounted on stub 122 by means of pin 124 is a handle 126.

Figure 2:
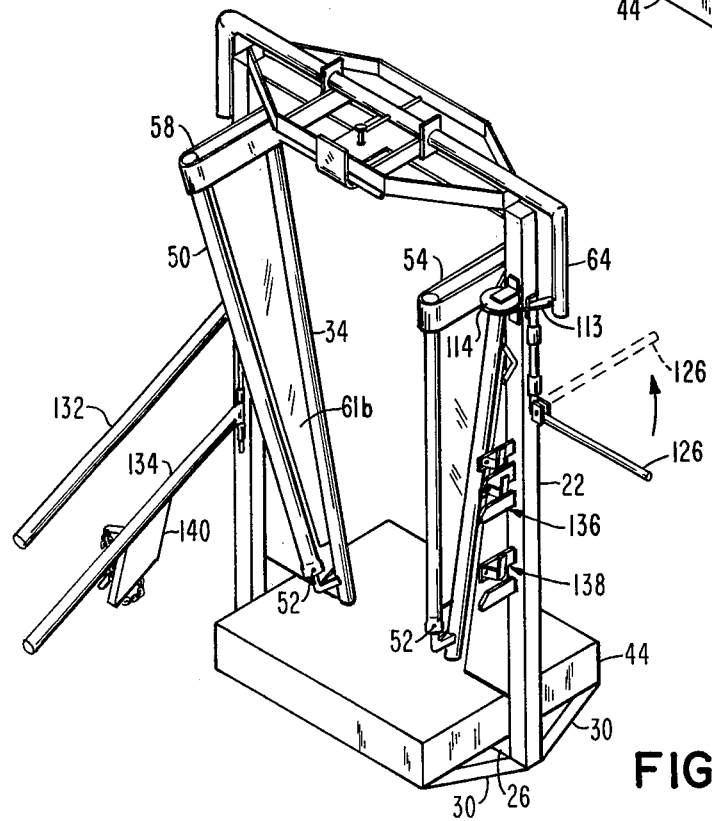
FIG. 2 is a view analogous to FIG. 1 but with certain of the components in a different position.
Figure 7:
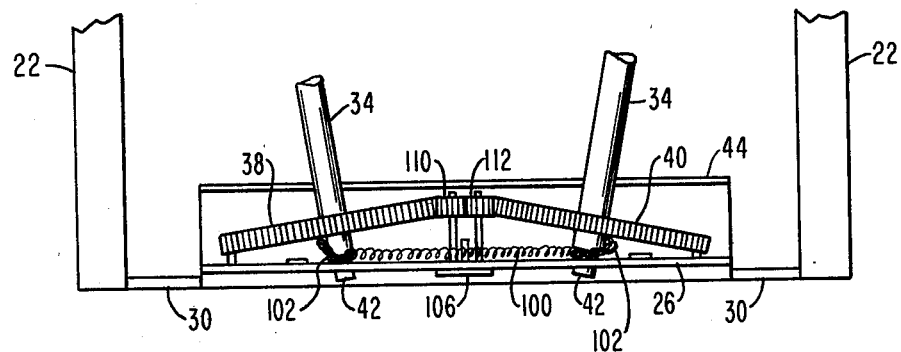
FIG. 7 is an enlarged cross-sectional view taken along the line 7—7 in FIG. 4 but with a cover removed.

As shown in FIG. 2, handle 126 may be positioned either downwardly in a storage position, so as to be out of the way of the operator, or it may be moved to a generally horizontal position and used to rotate spindle 116. Swinging of lever 115 serves to rotate spindle 116 and thereby induce tension into cable 113. That tension causes rotation of pipe 34 so that the operator is able to swing the ultimate gate assembly, comprised of both pipes 34 and tubes 50, into an open condition against the bias established by spring 100. By disposing the arrangement which includes handle 126 entirely to the side of the headgate, the operator is able to achieve complete and yet positive control while yet keeping his hands or arms entirely free of the movable portions of the basic portions of the headgate. That is particularly important from the standpoint of safety in case an animal should attempt to charge through the headgate before the latch assembly has been re-engaged following the release of a preceding animal.

Projecting laterally across the front of the assembly from one of uprights 22 and hingedly mounted on a spindle 130 affixed to that upright are a vertically-spaced pair of horizontal pipes 132 and 134. Pipe 132 is captivatable at its outer end portion within a latch assembly 136, and pipe 134 similarly is captivatable within a latch assembly 138. Slanting downwardly away from the overall assembly is a pad 140 provided with a releasable chain 142. The purpose of pipes 132 and 134 is to enable a holding down of the head of the animal after it has been restrained. The chin of the animal may be rested against pad 140 and its nose may be secured in place by use of chain 142.

It will be observed that the arrangement described and illustrated closely follows the general approach of the afore-described patent. At the same time, several improvements have now been newly disclosed which lead to satisfaction of the aforestated objects and, in general, an ultimate apparatus that is both more efficacious and also safer for use by the operator.

While a particular embodiment of the invention has been shown and described, it will be obvious to those skilled in the art that changes and modifications may be made without departing from the invention in its broader aspects. Therefore, the aim in the appended claims is to cover all such changes and modifications as fall within the true spirit and scope of that which is patentable.

I claim:
1. An animal restraint comprising:
a pair of generally-upright elongated pipes spaced apart somewhat greater than the width of an animal to be restrained;
means for mounting said pipes to permit rotation of each pipe about its longitudinal axis, said mounting means orienting said pipes to diverge apart in the upward direction;
a first spur gear mounted on one of said pipes near one end thereof;
a second spur gear mounted on the other of said pipes near a corresponding one end thereof;
said spur gears being canted downwardly and outwardly from one another;
a pair of elongated tubes;
means for securing one of said tubes to one of said pipes in generally-parallel-spaced relationship;
means for coupling the other of said tubes to the other of said pipes in generally parallel-spaced relationship and with the upper end portion of said other tube being movable toward and away from said other pipe;
means for urging said upper end away from said other pipe;
means for releasably latching the assemblies of the other ends of said pipes and the adjacent ends of said tubes in a closed condition in which said tubes are positioned between said pipes;
a pair of idler gears disposed between said spur gears, with one of said idler gears meshed with said first spur gear and the other of said idler gears meshed with said second spur gear and with said idler gears being mutually intermeshed, for slaving each of said pipes to the other in rotation;
each of said idler gears being rotatable about a vertical axis with the axes of rotation of said spur gears being tilted with respect to the vertical direction;
and a spring effectively coupled between said pipes for biasing said pipes rotationally toward said closed condition.

2. An animal restraint comprising:
a pair of generally-upright elongated pipes spaced apart somewhat greater than the width of an animal to be restrained;
means for mounting said pipes to permit rotation of each pipe about its longitudinal axis;
a first spur gear mounted on one of said pipes near one end thereof;
a second spur gear mounted on the other of said pipes near a corresponding one end thereof;
a pair of elongated tubes;
means for securing one of said tubes to one of said pipes in generally parallel-spaced relationship;
means for coupling the other of said tubes to the other of said pipes in generally parallel-spaced relationship and with the upper end portion of said other tube being movable toward and away from said other pipe;
means for urging said upper end away from said other pipe;
means for releasably latching the assemblies of the other ends of said pipes and the adjacent ends of said tubes in a closed condition in which said tubes are positioned between said pipes;
a lever affixed to said restraint adjacent to a side of one of said assemblies and swingable toward and away therefrom;
and opening means for mechanically coupling said lever to at least one of the pipe and tube of said one assembly to enable a swingable opening of said one assembly by manipulation of said lever, said opening means including a cable one end portion of which is secured around the one of said pipes adjacent to said lever and the other end portion of which is secured to said lever.

3. A restraint as defined in claim 1 or 2 in which said spur gears are mounted on the lower end portions of said pipes, and in which said latching means engages said assemblies near the upper ends of said pipes and tubes.

4. A restraint as defined in claim 2 which further includes a handle coupled to said lever and swingable between a generally vertical storage position and a generally horizontal position enabling said handle to move said lever in a direction inducing tension in said cable.

5. An animal restraint comprising:
- a pair of generally-upright elongated pipes spaced apart somewhat greater than the width of an animal to be restrained;
- means for mounting said pipes to permit rotation of each pipe about its longitudinal axis;
- a pair of elongated tubes;
- means for securing one of said tubes to one of said pipes in generally parallel-spaced relationship;
- means for coupling the other of said tubes to the other of said pipes in generally parallel-spaced relationship and with the upper end portion of said other tube being movable toward and away from said other pipe;
- means for urging said upper end away from said other pipe;
- means for releasably latching the assemblies of the other ends of said pipes and the adjacent ends of said tubes in a closed condition in which said tubes are positioned between said pipes;
- a framework within which said pipes are supported by said mounting means;
- a lever affixed to said framework adjacent to a side of one of said assemblies and swingable toward and away therefrom;
- opening means for mechanically coupling said lever to at least one of the pipe and tube of said one assembly to enable a swingable opening of said one assembly by manipulation of said lever;
- said opening means including a cable one end portion of which is secured around the one of said pipes adjacent to said lever and the other end portion of which is secured to said lever;
- means for slaving rotation of the other of said pipes to rotation of said one pipe, thereby also enabling a swingable opening of the other of said assemblies by manipulation of said lever.

6. A restraint as defined in claim 5 in which a pulley is mounted on and projects away from said framework, and in which said cable is disposed to ride over the outermost portion of said pulley.

7. A restraint as defined in claim 5 which further includes a handle coupled to said lever and swingable between a generally vertical storage position and a generally horizontal position enabling said handle to move said lever in a direction inducing tension in said cable.

* * * * *